United States Patent

[11] 3,611,981

[72] Inventor Ernst Warncke
       Lubeck, Germany
[21] Appl. No. 86,186
[22] Filed Nov. 2, 1970
[45] Patented Oct. 12, 1971
[73] Assignee Dragerwerk AG
       Lubeck, Germany

[54] GAS PRESSURE OPERATED ALARM DEVICE
6 Claims, 1 Drawing Fig.

[52] U.S. Cl. .................................................. 116/70,
       128/142.3, 137/557
[51] Int. Cl. ...................................................... G01l 19/12
[50] Field of Search ............................................ 116/34, 70,
       55, 67, 112, 114; 128/142, 142.3, 145.8; 137/557;
       222/3

[56] References Cited
UNITED STATES PATENTS

| | | | |
|---|---|---|---|
| 3,056,378 | 10/1962 | Simmonds .................... | 116/70 |
| 3,091,213 | 5/1963 | Maskell et al. ................ | 116/70 |
| 3,224,409 | 12/1965 | Fenger et al. ................. | 116/70 |
| 3,544,196 | 4/1966 | Replogle ...................... | 137/557 |
| 3,524,424 | 8/1970 | Roland ......................... | 116/70 |

*Primary Examiner*—Louis J. Capozi
*Attorney*—McGlew & Toren

ABSTRACT: An alarm device particularly for respirators having a pressure gas supply includes a housing, or body, having a first gas chamber which is adapted to be connected to the pressure gas supply. A valve is movable in the first gas chamber and it closes off a connection of the chamber with a second chamber having a second valve therein which closes the second chamber in respect to a discharge gas passage which connects to a signaling device such as gas operated whistle. A spring biases the first valve toward an open position and when the gas pressure in the line reduces, it opens the first valve and permits flow of the gas under pressure into the second chamber until it pressurizes sufficiently to open the second valve to permit the gas to flow to the signaling device and actuate the whistle. The second valve includes a control device defining a throttle passage which permits flow from a connecting chamber portion of the second chamber on one side of the second valve into an equalizing chamber portion on the other side of the second valve. After some time, the pressure equilibrium is again established in the second gas chamber to close the second valve again and to stop the flow of gas to the signaling device.

PATENTED OCT 12 1971 3,611,981
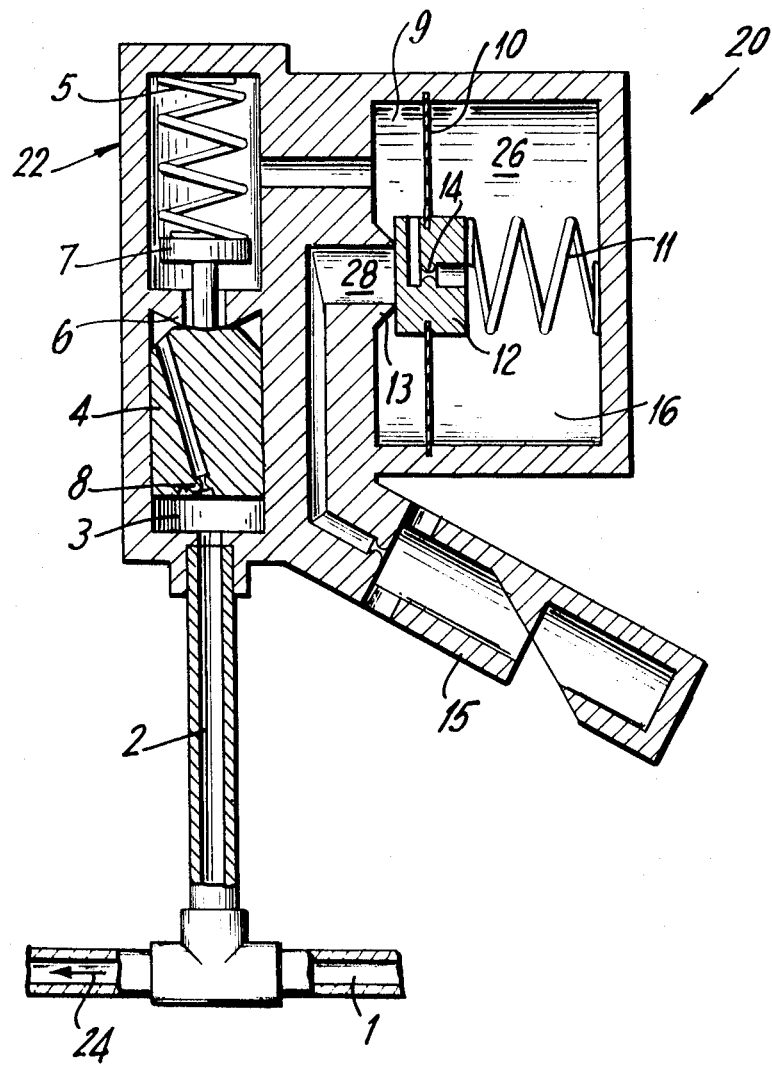
INVENTOR.
ERNST WARNCKE
BY
Mahlew & Toren
ATTORNEYS

GAS PRESSURE OPERATED ALARM DEVICE

SUMMARY OF THE INVENTION

This invention relates in general to alarm or signaling devices and, in particular, to a new and useful warning device for respirators which are connected to a pressure gas supply and which includes a signaling device or indicator for indicating when the gas supply has dropped below a certain pressure value and a control to stop the signal after a predetermined interval.

A known alarm apparatus is equipped with an alarm whistle which is sounded by the pressure gas at a certain pressure in the storage tank. The alarm whistle is connected to the pressure gas-high pressure line with the interposition of a spring-loaded valve therebetween. The valve opens automatically at a certain pressure and closes again later when the pressure is dropped to a certain lower value.

An embodiment of the valve consists in a spring-loaded closing piston having an opening therethrough and which serves as a valve shutter which is moved by the closing spring when the pressure drops below a certain value in order to open the connecting passage. In another known embodiment, the control device comprises a valve closed by gas pressure and opened by a spring-loaded plunger when the warning pressure is reached. The plunger is designed as a piston which is guided in a spring chamber and which seals the latter from the valve chamber.

The known devices have the disadvantage that they are subject to faulty operation because of the use of pistons since the latter can jam under certain circumstances in their guide. Another disadvantage of the known alarm devices which are connected directly to the high pressure is that they are under high pressure stress and this pressure varies within relatively wide limits during the warning periods. If a whistle is used as a warning device, the warning sound varies with the dropping of the supply pressure. The dimensioning of the relatively strong compression spring also presents some difficulties. In addition, the pressure losses are great.

Alarm devices for respirators having a pressure gas supply are known which include a pressure control arranged ahead of the signaling device, and which is connected into a line under low pressure leading to the signaling device, and which is actuated by a pressure-sensitive control element which is admitted by the high pressure. The pressure-sensitive control element is designed as a diaphragm which is admitted on one side by high pressure and on the other side by the low pressure. The diaphragm is loaded against the high pressure by a spring. The valve shutter of the valve bears directly on the diaphragm. The diaphragm on the low-pressure side can be so adjusted that it forms the shutter of the valve.

A whistle having a gas feed line arranged in a connection defining a throttle or nozzle can be employed for the alarm or signaling device. A partial pressure gas current is released to the alarm when the pressure in the pressure gas storage tank has dropped below a certain value. The partial pressure gas current flows toward the alarm whistle until the pressure gas storage tank is empty. The resulting pressure gas loss is considerable, particularly in respirators with regeneration of the breathing air and it leads at least during the alarm to a reduction of the time in which the respirator can be used. For this reason, the above-described alarm is not used in practice in circulatory respirators.

In accordance with the invention, there is provided an alarm for respirators which has a pressure gas supply and which includes a signaling device or warning device which operates for only a brief period of time so that excessive pressure gas losses are avoided. The respirator of the present invention includes a body defining a first gas chamber which is closed by a first valve from a second gas chamber which closes the second gas chamber in respect to a gas discharge passage which leads to a signaling device such as a gas operated whistle. The second gas chamber is divided by a valve member of diaphragm into a connecting chamber connected to the first gas chamber and an equalizing chamber. A control device is associated with the valve or diaphragm and it provides a throttling passage between the connecting passage and the equalizing passage which permits an equalizing gas flow during the actuation period so that there is a gradual equalization of the pressure on each side of the diaphragm and then a subsequent closing of the discharge and a stopping of the alarm device. The period of operation of the whistle can be regulated, for example, by selecting the cross section of the throttle passage of the control device. In general, it suffices if the warning signal is sounded for a period of about 15–30 seconds after which the warning sound is stopped. In one embodiment of the invention, the control device comprises a shutter mounted centrally on the diaphragm member in a position at which it closes the discharge passage to the signaling device and also provides the throttle passage therein which interconnects the connecting passage and the equalizing passage.

Accordingly, it is an object of the invention to provide an improved alarm device for use with respirators which includes means for directing a portion of the gas pressure supply for the respirator to a signaling device such as a sound whistle and for discontinuing the flow of the pressurized gas after a predetermined warning signal has been given.

A further object of the invention is to provide an alarm device, particularly for respirators which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The only FIGURE of the drawing is a schematic transverse sectional view of an alarm device constructed in accordance with the invention.

GENERAL DESCRIPTION OF THE PREFERRED EMBODIMENT

Referring to the drawing, in particular, the invention embodied therein comprises an alarm device generally designated 20 which includes a housing 22 which is connected through a connecting line 2 to a high pressure line 1. The high pressure line 1 is adapted to be connected, for example, to a throttle valve of a tank of compressed oxygen which, for example, flows with an initial pressure of 200 kp/qcm. Flow, for example, may be in a direction of the arrow 24 to a respirator (not shown). The pressure propagates through the connecting line 2 into a first gas chamber 3 defined inside the housing 22 and it acts on a piston, or first valve member 4, to cause it to move against a seat 6 and close a connecting passage portion 9 of a second gas chamber 26. The piston 4 is pressed by the opposite biasing force of a spring 5 to engage with the valve 6 so that no gas can escape.

As soon as the bottle pressure in the line 1 drops to the warning pressure of, for example, 40 kp/qcm., the force of the spring 5 predominates and causes the piston 4 to move in an opening direction to open the connection between the chamber 2 and the connecting chamber portion 9 of the second gas chamber 26. When the valve 4 is opened, pressure gas can flow through the throttle passage 8 into the connecting chamber 9. A diaphragm or valve member 10 extends across the chamber 26 and divides it into the connecting chamber 9 and an equalizing chamber 16. A closing spring 11 urges the valve shutter member or control member 12 into engagement with a seat 13 which surrounds the inner end of a discharge passage 28.

When the dial 4 is opened so that the pressure of the line 1 can communicate through the connecting passage and with the diaphragm 10, the diaphragm 10 will move to cause shutter 12 to move off the seat 13 and move against the force of the spring 11 to permit flow of the pressure gas through the discharge passage 28 and into the signaling device 15 which, in the embodiment illustrated, comprises a gas operated whistle.

A feature of the invention is that the control member 12 includes a throttle passage 14 which permits flow from the connecting passage into the equalizing passage 26 during the time in which there is also gas flowing through the discharge passage 28 to operate the whistle 15. The acoustic signal or whistle 15 continues to sound during the gas flow through the discharge 28. After some time, a pressure equilibrium is established between the chamber 9 and 16 so that the valve 12 closes the seat 13 and the flow of the partial gas pressure current to the signal 15 is stopped. There is a further pressure loss after the warning.

What is claimed is:

1. An alarm for a respirator having a pressure gas line comprising, a housing having wall means defining a first gas chamber adapted to be connected to a pressure line and having a second gas chamber connected to said first chamber, said wall means defining a signal gas discharge passage connected to said second gas chamber, said first gas chamber having a first gas chamber discharge passage connected to said second gas chamber, a first valve closing said first gas chamber discharge passage at a predetermined pressure condition in said line and opening said first gas chamber discharge passage upon reduction of the pressure from said predetermined pressure condition, a second valve closing said signal gas discharge passage and dividing said second gas chamber into a connecting chamber portion connected to said first gas discharge passage and an equalizing chamber portion on the other side of said second valve control means associated with said second valve and defining a throttle passage from said connecting chamber portion to said equalizing chamber portion, said spring means biasing said first valve toward an opening direction, and second spring means biasing said second valve toward a closing position, said first valve being operable by said first spring means upon the dropping of said predetermined pressure in the pressure gas line to cause flow of gas to said second chamber and said signal gas discharge passage.

2. An alarm, according to claim 1, wherein said control means includes a passage extending therethrough and a throttle installed in the central portion of said passage.

3. An alarm, according to claim 1, wherein said first valve comprises a piston slidable in said first gas chamber and having a passage defined therethrough, said passage being closed when said valve is in a closed position and being opened to communicate flow therethrough and to said first gas discharge passage.

4. An alarm, according to claim 1, wherein said signal gas discharge passage includes a throttle therein.

5. An alarm, according to claim 1, wherein said housing wall means includes an elongated portion having an intermediate valve seat and having one end defining the inlet to said first gas chamber and having an opening through said valve seat leading to said connecting passage, said first spring means comprising a spring in said connecting passage biased against said valve member.

6. An alarm, according to claim 1, wherein said second valve comprises a diaphragm, said control means comprising a shutter carried centrally on said diaphragm.